Patented Sept. 16, 1952

2,610,958

UNITED STATES PATENT OFFICE 2,610,958

THIXOTROPIC COMPOSITIONS

Birger W. Nordlander, Schenectady, and John A. Loritsch, Scotia, N. Y., assignors to General Electric Company, a corporation of New York No Drawing. Application December 31, 1949, Serial No. 136,411

8 Claims. (Cl. 260—40)

This invention relates to thixotropic compositions, and more particularly to polymerizable thixotropic coating and filling compositions comprising a polymerizable liquid and a filler.

A problem of long standing encountered in factory practice in connection with the use of conventional varnishes for coating or filling applications is the excessive drainage from the coated or filled part after the varnish has been applied. A portion of this drainage occurs at room temperature immediately after the part has been removed from the treating tank because of the fluid nature of the conventional varnishes generally employed. This drainage continues until sufficient solvent has evaporated to cause the viscosity of the varnish on the surface or in the interstices of the treated object to become sufficiently high to enable it to remain in position. It is obvious that the nature of the process is such that too much of the varnish drains away from the top of the treated part and a surplus collects at the bottom of the part, resulting in a very uneven and undesirable ultimate distribution of the varnish base throughout the part. Further drainage occurs during the early stages of any baking process which might be involved, when the varnish base remaining in the treated part becomes increasingly fluid as the temperature is increased. This drainage will continue until the temperature is sufficiently high, and has been applied sufficiently long to cause the varnish to thicken or "skin over" due to polymerization reactions of one type or another, such as condensation, oxidation and addition reactions. Conventional varnishes also have a disadvantage in that they draw away from sharp corners and edges, leaving these regions practically bare.

The net result of methods of coating and filling in such a manner is a very uneconomical utilization of the weight of varnish originally applied, only a fraction being retained. Furthermore, an undesirably uneven distribution of the varnish in the interstices and on the surface of the treated part results.

Where the problem of coating or filling electrical devices, such as, for example, electrical coils, has been involved, the amount of material retained after a single application is in most cases insufficient to afford a structure having the required electrical and mechanical properties. Several successive applications and bakings are usually necessary, adding considerably to the cost of the treatment. In the case of open structures, such as electrical coils, a complete filling becomes impossible employing the coating and filling compositions heretofore known in the art, not only because of the fact that the inert, volatile solvent in the composition must be expelled after each application, but also because many voids are sealed off during the evaporation of the solvents. In many cases these voids cannot be filled by additional varnish regardless of how many subsequent treatments are applied to the structure. This causes the treated structure to have an unequal thermal conductivity from one part to another as well as a much lower over-all heat dissipation rate as compared with a completely void-free structure. In high voltage equipment the presence of voids in the insulation also gives rise to internal corona discharge with resulting deterioration of the insulation.

Certain of the above difficulties can be eliminated by the use of so-called solventless varnishes. This term is intended in the present disclosure to cover compositions of matter which are polymerizable fluids substantially free of inert, volatile solvents such as those used in conventional varnishes, and which, by the incorporation of suitable catalysts, may be caused to polymerize to form substantially infusible and insoluble materials without the necessity of taking up oxygen from the air and without forming volatile products.

Since the conversion from the fluid to the hard, infusible stage occurs with little or no loss of the weight of material applied in the coating or filling operation, it is possible, by the use of proper technique, not only to fill completely all the spaces in an open structure, such as a coil, but also to maintain this condition subsequently during the curing operation, provided that substantially no drainage of varnish occurs during the curing process.

Many of the solventless varnishes of the type with which the present invention is concerned, and which will be hereinafter more fully described, comprise fairly fluid, non-volatile compositions. Therefore, in comparison with the conventional varnishes containing highly viscous or solid bases, these solventless varnish compositions suffer the disadvantage that they do not become increasingly viscous on standing at room temperature by the evaporation of a volatile inert solvent. As a result, an open structure coated or filled with such a solventless varnish composition will continuously suffer loss of the varnish by drainage after it has been withdrawn from the treating tank and before it has been polymerized by heating. Furthermore, in common with the conventional varnishes containing appreciable amounts of solvents, many of the solventless varnishes have the disadvantage that during the early stages of the curing process their viscosity is substantially reduced, further aggravating the drainage problem. The difficulties arising out of this property of the solventless varnishes in many cases have proved to be serious enough to offset the principal advantage in using the solventless varnishes for the filling of open structures.

It is an object of the present invention to provide liquid coating and filling compositions which will not drain from objects prior to and during curing.

Another object of this invention is to provide coating and filling compositions which may be applied and cured without loss of the composition.

A further object of the present invention is to provide coating and filling compositions which when applied to objects will remain in situ before and during curing even on corners and sharp edges.

It has been discovered that the advantages in the use of solventless varnishes may be realized in coating and filling operations and at the same time the disadvantage of excessive drainage may be avoided by employing the compositions of this invention. These compositions may be converted by means of heat to an infusible and insoluble state and are suitable in general for coating and filling operations and particularly for the insulation of electrical equipment. After a coating of one of the present compositions has been applied to a part, little or no drainage of the composition from the part occurs, either at room temperature or at the elevated temperatures required for complete conversion of the composition to the infusible and insoluble state. The unusual combination of properties characterizing these compositions rests in the discovery that suitable quantities of certain specific fillers, in combination with solventless varnishes, or polymerizable liquids, form compositions which are fluid as long as they are kept in an agitated condition but solidify shortly after agitation has ceased and will not flow either at room temperature or at temperatures up to about 150° C. unless mechanically disturbed before they have hardened by polymerization.

While it is well known that the incorporation of fillers into a varnish will reduce the flow of the resulting mixture by reason of increased viscosity, this general property is not relied upon for the properties of the present compositions. The specific fillers which are here employed with solventless varnishes form thixotropic compositions capable of undergoing isothermal, reversible, sol-gel transformations, a fluid sol condition existing as long as the mixture is agitated, the sol reverting to a gel within a very short time after agitation has ceased.

However, upon heating the gel it polymerizes into an infusible product which is no longer capable of reversion into the fluid sol state. The system may be simply expressed by the following relationship:

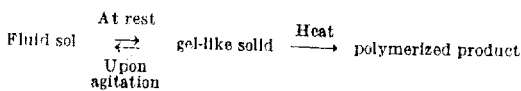

The term "thixotropy" is used herein to denote the property of a fluid filler liquid composition to revert rapidly on standing into a gel-like mass having sufficient cohesive strength to withstand distortion by gravitational force when suspended freely as on an inverted receptacle or on a coated object. The gel is also of such a nature that it can be fluidified by the application of mechanical agitation as by shaking, stirring, vibrating, etc.

The property of thixotropy as understood herein is thus characterized by a reversible isothermal sol gel transition.

The compositions referred to above as solventless varnishes which are employed in combination with specific fillers to form the thixotropic composition of this invention are polymerizable fluids comprising an unsaturated alkyd resin. These liquid unsaturated alkyd resins are the reaction products of polyhydric alcohols, mixtures of polyhydric alcohols or mixtures of polyhydric and monohydric alcohols, and an alpha unsaturated alpha, beta polycarboxylic acid or a plurality of polycarboxylic acids, one of which, at least, is an unsaturated polycarboxylic acid, the resinous material having an acid value of up to 60 and preferably between 45 and 60. Examples of such polyhydric alcohols are ethylene glycol, di- and triethylene glycols, propylene glycol, trimethylene glycol, tetramethylene glycol, pentamethylene glycol, glycerine or pentaerythritol in combination with a monohydric alcohol, etc. Examples of alpha unsaturated alpha, beta polycarboxylic acids are maleic, fumaric, and itaconic acids. Anhydrides of polycarboxylic acids may also be employed. The term "polycarboxylic acid" as used herein is intended to include within its meaning the anhydrides of such acids. In addition to one or more of the unsaturated polycarboxylic acids, saturated polycarboxylic acids may also be present in the reaction mixture in the preparation of the resins referred to above. Examples of such saturated polycarboxylic acids are succinic, adipic, sebacic and phthalic acids.

In addition to the above unsaturated alkyd resins, the polymerizable fluids which are used in the present compositions may contain polymerizable substances such as, for example, esters of unsaturated monohydric alcohols and polycarboxylic acids, including unsaturated polycarboxylic acids, halogenated polycarboxylic acids and polybasic inorganic acids. Examples of such substances are diallyl phthalate, diallyl succinate, diallyl maleate, diallyl fumarate, diallyl itaconate, dialyl chlorophthalates, and triallyl phosphate. Other substances which may be incorporated in these poymerizable liquids are esters of monohydric alcohols and unsaturated polycarboxylic acids which are capable of copolymerizing with unsaturated alkyd resins such as, for example, dioctyl itaconate, dibenzyl itaconate, diethyl fumarate and dibenzyl fumarate.

The thixotropic compositions of this invention may be converted into an infusible, insoluble state by means of heat alone, for example, by curing parts coated or filled with these compositions at temperatures from about 80° C. to about 150° C., or more preferably from about 100° C. to about 125° C. However, for practical reasons, it is desirable to incorporate a polymerization catalyst in order to accelerate the polymerization of the coating or filling compositions. Any of the catalysts known to those skilled in the art may be employed. Examples of such catalysts which have been found to be particularly suitable are benzoyl peroxide, tertiary butyl perbenzoate, ditertiary butyl diperphthalate, and tertiary butyl hydroperoxide. Any suitable amount of catalyst may be used, but in general the catalyst concentration will be within the range of from about 0.5 to about 2.0 percent by weight of the polymerizable liquid.

It has been found that only certain fillers in combination with the above polymerizable liquids will afford the thixotropic properties characterizing these compositions. Such fillers will hereinafter be referred to as "effective" fillers. Chromic oxide ($Cr_2O_3$), titanium dioxide ($TiO_2$), acicular zinc oxide ($ZnO$) and red iron oxide ($Fe_2O_3$) in powdered form are particularly effective fillers in our thixotropic compositions. Other thixotropic solventless varnish thixotropic systems are described in copending applications Serial Numbers 136,413, 136,412, 136,415, 136,416, 136,417, and 136,418, filed concurrently herewith and assigned to the same assignee as the present application.

The degree of thixotropy of the compositions of our invention may be controlled by varying the concentration of effective filler employed. If the amount of effective filler is too low, no distinct gel formation occurs upon cessation of agitation. As the concentration of effective filler in the compositions is increased, a point is reached where the thixotropic sol-gel transformation becomes apparent. As the concentration of effective filler is increased beyond this point the composition gradually becomes thicker until a point is reached whereat it becomes so thick that it can be fluidified only with great difficulty. This latter fact is of practical importance since the rate of transformation is a controlling factor in determining the amount of material retained on an object upon withdrawal from a bath of one of our compositions. If too much effective filler is employed, the fluidity of the sol drops below the point where practical application of such compositions is feasible. It has been found that, in general, when the above metal oxides are employed as effective fillers, filler concentrations of from about 40 per cent to about 60 per cent of the total amount of polymerizable liquid and effective filler afford the preferred range of properties for most coating and filling operations.

The degree of thixotropy may also be controlled by varying the amount of moisture in the filler when the latter is of the oxide type. The exact minimum amount of moisture may be found by experimentation and the amounts most suitable for the various fillers are disclosed hereinafter. With the minimum necessary quantity of moisture in the filler, a smooth thixotropic composition is readily attained upon stirring. Lower amounts than the necessary minimum produce lumpy compositions which do not smooth out even with continued stirring. On the other hand, higher concentrations of moisture than the necessary minimum, facilitate the incorporation of the filler to yield permanently thixotropic compositions.

Other fillers in addition to the effective fillers referred to above may also be incorporated in the present compositions in small amounts which do not affect the thixotropic property. Such fillers are not in themselves capable of affording thixotropic compositions when mixed with the polymerizable liquids which are employed and are referred to as "non-effective" fillers. Examples of such fillers are silex or sand, talc, carborundum, alundum, litharge, iron powder, zirconium oxide, calcium tungstate, tungsten oxide, and nickel oxide. However, in combination with effective fillers such non-effective fillers may be used to provide thixotropic compositions. This offers a convenient method of obtaining the thixotropic characteristics of the present compositions while retaining a high total filler content and utilizing to advantage whatever outstanding physical property (dielectric, moisture resistance, hardness, tensile strength, toughness, etc.) that the inert filler may contribute to the final heat-polymerized product.

In order that those skilled in the art may better understand how the present invention may be carried into effect, the following examples are given by way of illustration and not by way of limitation, all parts being by weight:

*Example 1*

| | Parts |
|---|---|
| Diethylene glycol maleate | 24.5 |
| Diallyl phthalate | 24.5 |
| Tertiary butyl perbenzoate | 1.0 |
| Red iron oxide ($Fe_2O_3$) (dried) | 50.0 |

The above ingredients were thoroughly mixed until a homogeneous mass was obtained. However, the resultant product, while thixotropic to a pronounced degree, was lumpy. When water equivalent to a minimum of about 0.3% by weight of the total above ingredients was present, a smooth thixotropic mass was attained. Lesser amounts of water produced lumpy mixtures which did not smooth out even after prolonged stirring. On the other hand, higher concentrations of water were also found to facilitate the incorporation of the filler into the mixture. A smooth glass rod one-quarter inch in diameter was dipped in the mixture, slowly withdrawn and immediately suspended in a tared container. After sixteen hours at room temperature, no material had drained from the rod. Neither was any drainage apparent after sixteen more hours at 100° C. during which period cure was effected. This is in direct contradistinction to results obtained with the above composition when no filler was used at all or when a non-effective filler was used. In both the latter cases only a very small fraction of the original coating remained after the rod was dipped in the material and allowed to hang for sixteen hours at room temperature and was cured for sixteen hours at 100° C. When no water or moisture was present in the red iron oxide filler, about 6% by weight of the coating had drained off after sixteen hours at room temperature. Additional amounts of water over the 0.3% minimum produced favorable results. For example, when the water content was 0.9% by weight of the filler, the results were the same as when 0.3% by weight of water or moisture was present.

Diethylene glycol maleate phthalate was substituted for the diethylene glycol maleate in the above formulation with similar results.

*Example 2*

| | Parts |
|---|---|
| Diethylene glycol maleate phthalate | 33.3 |
| Diallyl phthalate | 16.4 |
| Ditertiary butyl diperphthalate | 0.5 |
| Red iron oxide ($Fe_2O_3$) 325 mesh | 49.8 |
| (At least 0.3% $H_2O$.) | |

The above ingredients were mixed together and passed through a buhrstone mill. The final product exhibited thixotropic and coating properties similar to those of the composition in Example 1.

*Example 3*

| | Parts |
|---|---|
| Diethylene glycol maleate | 27 |
| Dibenzyl itaconate | 9 |
| Diallyl phthalate | 9 |
| Tertiary butyl perbenzoate | 1 |
| Red iron oxide ($Fe_2O_3$) 325 mesh | 54 |
| (At least 0.3% $H_2O$.) | |

The red iron oxide was incorporated by stirring into the rest of the ingredients until a smooth, homogeneous mass was obtained. When used to coat a one-quarter inch glass rod, no drainage occurred after standing 17.5 hours at room temperature. Neither was any drainage apparent after curing at 100° C. for 14 hours.

*Example 4*

| | Parts |
|---|---|
| Dipropylene glycol maleate | 25.8 |
| Dioctyl itaconate | 17.1 |
| Tertiary butyl perbenzoate | 1.7 |
| Red iron oxide ($Fe_2O_3$) 325 mesh | 55.4 |
| (At least 0.3% $H_2O$.) | |

The above ingredients were mixed thoroughly until a smooth, homogeneous mixture resulted. This composition was moderately thixotropic in character. A glass rod coated with this material in the manner described in the foregoing examples retained all of the composition picked up during immersion when allowed to stand for 17 hours at room temperature. When the coated rod was baked for 14 hours at 100° C., there was no evidence of any drainage during the baking operation.

*Example 5*

| | Parts |
|---|---|
| Ethylene glycol itaconate | 27 |
| Diallyl phthalate | 18 |
| Tertiary butyl perbenzoate | 1 |
| Red iron oxide powder | 54 |
| (At least 0.3% $H_2O$.) | |

The above ingredients were thoroughly mixed until a smooth, homogeneous composition was obtained. This composition exhibited pronounced thixotropic properties.

*Example 6*

| | Parts |
|---|---|
| Diethylene glycol maleate | 28 |
| Diallyl succinate | 19 |
| Tertiary butyl perbenzoate | 1 |
| Red iron oxide powder | 52 |
| (At least 0.3% $H_2O$.) | |

When the above ingredients were thoroughly mixed, a smooth, uniform composition having pronounced thixotropic properties resulted.

*Example 7*

| | Parts |
|---|---|
| Diethylene glycol maleate | 36.0 |
| Diallyl phthalate | 18.0 |
| Benzoyl peroxide | 0.6 |
| Red iron oxide powder | 45.4 |
| (At least 0.3% $H_2O$.) | |

The above ingredients were thoroughly mixed into a homogeneous product by passing twice through a buhrstone mill. The resulting product exhibited pronounced thixotropic properties.

*Example 8*

| | Parts |
|---|---|
| Diethylene glycol maleate phthalate | 35.3 |
| Diallyl phthalate | 12.8 |
| Tertiary butyl hydroperoxide | 0.5 |
| Red iron oxide powder | 51.4 |
| (At least 0.3% $H_2O$.) | |

A strongly thixotropic composition was obtained by passing the above ingredients twice through a buhrstone mill.

Chromic oxide ($Cr_2O_3$) was also found to produce thixotropic solventless varnish compositions. Whereas in the case of red iron oxide ($Fe_2O_3$) is was found that at least 0.3% by weight of moisture was necessary in the filler, it was found that in certain instances satisfactory thixotropic compositions could be made using $Cr_2O_3$ when its moisture content was as low as 0.03%. Chromic oxide of this low water content could be used when using diallyl phthalate alone and certain diallyl phthalate-diethylene glylcol maleate phthalate mixtures. However, there was no limit to the proportions of polymeric material when at least 0.3% moisture in water was present in the chromic oxide.

*Example 9*

| | Parts |
|---|---|
| Diallyl phthalate | 17 |
| Diethylene glycol maleate | 17 |
| Tertiary butyl perbenzoate | 1 |
| Chromic oxide powder | 65 |
| (At least 0.3% $H_2O$.) | |

The above materials were thoroughly mixed to yield a smooth homogeneous mixture. When a smooth glass rod was dipped into the mixture, withdrawn and allowed to hang there was no apparent drainage after sixteen hours at room temperature, or an additional sixteen hours at 100° C. On the other hand, when the chromic oxide used in the above example contained only 0.03% moisture, the mixture was not thixotropic and almost completely drained from a glass rod which had been dipped in it.

Titanium dioxide was also found to produce thixotropic compositions with solventless varnishes which are suitable for the purposes of the present invention. In general, when the anatase type of titanium dioxide was used, a moisture content of at least 0.2% to 0.3% by weight was required in order to produce an effective thixotropic composition. A greater amount of moisture merely facilitates the mixing process and does not detract from the characteristics.

*Example 10*

| | Parts |
|---|---|
| Diallyl phthalate | 24.5 |
| Diethylene glycol maleate | 24.5 |
| Tertiary butyl perbenzoate | 1.0 |
| Titanium dioxide (anatase) | 50.0 |
| (At least 0.2%–0.3% $H_2O$.) | |

The above ingredients were stirred thoroughly to form a smooth, homogeneous mixture. A glass rod dipped in the mixture showed no drainage of the composition after hanging free in air for sixteen hours at room temperature or an additional sixteen hours at 100° C. Reasonably greater amounts of moisture than 0.2% to 0.3% in the filler do not detract from the favorable characteristics of the compositions. For example, a mixture made as above, except that the moisture content of the filler was 1.2%, was suitable for the present use.

Rutile type titanium dioxide also may be used in connection with the present invention. In using rutile type titanium dioxide having at least 0.2% to 0.3% moisture in conjunction with solventless varnishes, it was found that all materials had drained from dipped glass rods in a matter of a few hours. Upon investigation it was found that a water extract of the rutile type titanium oxide was alkaline whereas the anatase type titanium dioxide and other oxides described above had acidic water extracts. When the rutile type oxide was treated with a dilute mineral acid, such as hydrochloric acid to make it acidic, i. e. giving an acidic pH to distilled water, compositions made using it were entirely satisfactory.

*Example 11*

|  | Parts | | |
|---|---|---|---|
|  | A | B | C |
| Diallyl phthalate | 23.5 | 23.0 | 22.0 |
| Diethylene glycol maleate | 23.5 | 23.0 | 22.0 |
| Tertiary butyle perbenzoate | 1.0 | 1.0 | 1.0 |
| Rutile titanium dioxide (acid treated) At least 0.2%–0.3% moisture) | 52.0 | 53.0 | 55.0 |

The above materials were stirred in the proportions indicated thoroughly to give a smooth mixture which retained its thixotropic properties for several weeks. When a one-quarter inch smooth glass rod was dipped into the above composition and removed, no drainage occurred after sixteen hours at room temperature or after sixteen additional hours at 100° C.

Zinc oxide (ZnO) of the acicular type may also be used as a thixotrope producing filler for the solventless varnishes set forth in this invention. A water content of at least 0.1% by weight in the filler was found necessary to impart thixotropic properties.

*Example 12*

| | Parts |
|---|---|
| Diallyl phthalate | 22.0 |
| Diethylene glycol maleate | 22.0 |
| Tertiary butyl perbenzoate | 1.0 |
| Zinc oxide (ZnO) powder, acicular (At least about 0.1% H₂O.) | 55.0 |

The above ingredients were easily mixed by stirring into a smooth homogeneous composition. When a one-quarter inch smooth glass rod was dipped into the mixture and removed, no drainage occurred after sixteen hours at room temperature or after sixteen hours more at 100° C.

What we claim as new and desire to secure by Letters Patent of the United States is:

1. A thixotropic composition comprising (a) a polymerizable fluid comprising a liquid unsaturated alkyd resin obtained by the esterification of a mixture of ingredients comprising a polyhydric alcohol and an alpha unsaturated alpha,beta polycarboxylic acid and (b) a moisture-containing filler comprising a metallic oxide of the group consisting of $Fe_2O_3$ having a moisture content of at least 0.3 percent, $Cr_2O_3$ having a moisture content of at least 0.3 percent, ZnO having a moisture content of at least 0.1 percent, and $TiO_2$ having a moisture content of at least 0.2 percent, the said filler comprising from 40 to 60 percent, by weight, of the total weight of the latter and the polymerizable fluid.

2. A thixotropic composition comprising (a) a polymerizable fluid comprising (1) a liquid unsaturated alkyd resin obtained by the esterification of a mixture of ingredients comprising a polyhydric alcohol and an alpha unsaturated alpha,beta polycarboxylic acid and (2) a polymerizable ester of an unsaturated monohydric alcohol and a polycarboxylic acid, and (b) a moisture-containing filler comprising a metallic oxide of the group consisting of $Fe_2O_3$ having a moisture content of at least 0.3 percent, $Cr_2O_3$ having a moisture content of at least 0.3 percent, ZnO having a moisture content of at least 0.1 percent, and $TiO_2$ having a moisture content of at least 0.2 percent, the said filler comprising from 40 to 60 percent, by weight, of the total weight of the latter and the polymerizable fluid.

3. A thixotropic composition comprising (a) a polymerizable fluid comprising (1) liquid diethylene glycol maleate and (2) diallyl phthalate, and (b) a moisture-containing filler comprising a metallic oxide of the group consisting of $Fe_2O_3$ having a moisture content of at least 0.3 percent, $Cr_2O_3$ having a moisture content of at least 0.3 percent, ZnO having a moisture content of at least 0.1 percent, and $TiO_2$ having a moisture content of at least 0.2 percent, the said filler comprising from 40 to 60 percent, by weight, of the total weight of the latter and the polymerizable fluid.

4. A thixotropic composition comprising (a) a polymerizable fluid comprising (1) liquid diethylene glycol maleate and (2) a polymerizable ester of an unsaturated monohydric alcohol and a polycarboxylic acid and (b) a moisture-containing filler comprising a metallic oxide of the group consisting of $Fe_2O_3$ having a moisture content of at least 0.3 percent, $Cr_2O_3$ having a moisture content of at least 0.3 percent, ZnO having a moisture content of at least 0.1 percent, and $TiO_2$ having a moisture content of at least 0.2 percent, the said filler comprising from 40 to 60 percent, by weight, of the total weight of the latter and the polymerizable fluid.

5. A thixotropic composition comprising a polymerizable fluid containing liquid diethylene glycol maleate, diallyl phthalate, and a moisture-containing filler comprising $Fe_2O_3$ having a moisture content of at least 0.3, the said filler comprising from 40 to 60 percent, by weight, of the total weight of the latter and the polymerizable fluid.

6. A thixotropic composition comprising a polymerizable fluid containing liquid diethylene glycol maleate, diallyl phthalate, and a moisture-containing filler comprising $Cr_2O_3$ having a moisture content of at least 0.3 percent, the said filler comprising from 40 to 60 percent, by weight, of the total weight of the latter and the polymerizable fluid.

7. A thixotropic composition comprising a polymerizable fluid containing liquid diethylene glycol maleate, diallyl phthalate, and a moisture-containing filler comprising ZnO having a moisture content of at least 0.1 percent, the said filler comprising from 40 to 60 percent, by weight, of the total weight of the latter and the polymerizable fluid.

8. A thixotropic composition comprising a polymerizable fluid containing liquid diethylene glycol maleate, diallyl phthalate, and a moisture-containing filler comprising $TiO_2$ having a moisture content of at least 0.2 percent, the said filler comprising from 40 to 60 percent, by weight, of the total weight of the latter and the polymerizable fluid.

BIRGER W. NORDLANDER.
JOHN A. LORITSCH.

(References on following page)

REFERENCES CITED

The following references are of record in the file of this patent:

UNITED STATES PATENTS

| Number | Name | Date |
|---|---|---|
| 2,086,714 | Hucks | July 13, 1937 |
| 2,220,621 | Ellis | Nov. 5, 1940 |
| 2,443,736 | Kropa | June 22, 1948 |
| 2,467,526 | Harris | Apr. 19, 1949 |

OTHER REFERENCES

"Industrial Chemistry of Colloidal and Amorphous Materials" by Lewis, Squires & Broughton, published by MacMillan, page 327. (Copy in Scientific Library.)

"Physical Properties of Printing Inks" by Healey, American Ink Maker, May 1943, pp. 22 and 25-26.